United States Patent [19]

McMurtry et al.

[11] Patent Number: 5,189,806
[45] Date of Patent: Mar. 2, 1993

[54] METHOD OF AND APPARATUS FOR SCANNING THE SURFACE OF A WORKPIECE

[75] Inventors: David R. McMurtry, Wotton-Under-Edge; Brian C. R. Henning, Thornbury, both of United Kingdom

[73] Assignee: Renishaw plc, Gloucestershire, England

[21] Appl. No.: 928,667

[22] Filed: Aug. 17, 1992

Related U.S. Application Data

[63] Continuation of Ser. No. 555,464, filed as PCT GB89/01504 Dec. 16, 1989, abandoned.

[30] Foreign Application Priority Data

Dec. 19, 1988 [WO] PCT Int'l Appl . PCT/GB88/01135
Apr. 19, 1989 [GB] United Kingdom ................ 8908854

[51] Int. Cl.⁵ ........................... G01B 5/03; G01B 7/03
[52] U.S. Cl. ........................................ 33/503; 33/553; 33/554
[58] Field of Search ................... 33/503, 558.01, 558.4, 33/553, 554

[56] References Cited

U.S. PATENT DOCUMENTS

| | | |
|---|---|---|
| 2,627,119 | 2/1953 | Graham . |
| 2,867,043 | 1/1959 | Jarret et al. . |
| 3,531,868 | 10/1970 | Stevenson . |
| 3,727,119 | 4/1973 | Stanley et al. . |
| 3,750,295 | 8/1973 | Nordmann . |
| 3,771,230 | 11/1973 | Sartorio . |
| 3,805,393 | 4/1974 | Lemelson ............................ 33/555 |
| 3,824,893 | 7/1974 | Sartorio . |
| 3,869,799 | 3/1975 | Neurer et al. . |
| 4,060,906 | 12/1977 | Heizmann . |
| 4,084,323 | 4/1978 | McMurtry . |
| 4,153,998 | 5/1979 | McMurtry . |
| 4,158,919 | 6/1979 | McMurtry . |
| 4,164,694 | 8/1979 | Amsbury et al. ..................... 33/554 |
| 4,187,614 | 2/1980 | Abiru et al. . |
| 4,384,332 | 5/1983 | McMurtry . |
| 4,384,407 | 5/1983 | Miyamoto ............................ 33/503 |
| 4,477,973 | 10/1984 | Davies . |
| 4,542,467 | 9/1985 | McMurtry . |
| 4,611,403 | 9/1986 | Morita et al. . |
| 4,636,960 | 1/1987 | McMurtry . |
| 4,703,443 | 10/1987 | Moriyasu . |
| 4,769,763 | 9/1988 | Trieb et al. ........................... 33/503 |
| 4,819,491 | 4/1989 | McMurtry . |
| 4,835,718 | 5/1989 | Breyer et al. ........................ 33/503 |
| 4,888,877 | 12/1989 | Enderle et al. . |
| 4,901,256 | 2/1990 | McMurtry . |

FOREIGN PATENT DOCUMENTS

0317967 11/1988 European Pat. Off. .
1638048 3/1971 Fed. Rep. of Germany .
3309122 9/1984 Fed. Rep. of Germany .

(List continued on next page.)

OTHER PUBLICATIONS

PCT/GB89/00160-WO89/07745 Pub. Date Aug. 8, 1989-Surface Sensing Device.

*Primary Examiner*—Thomas B. Will
*Attorney, Agent, or Firm*—Oliff & Berridge

[57] ABSTRACT

A method of scanning a workpiece surface is disclosed in which a machine carrying a scanning head is moved along a path, preferably at constant velocity, while a surface contacting device is moved by the scanning head to oscillate transversely to the instantaneous path direction to scan an area of the surface. Transducers on the machine, the head, and where necessary the surface contacting device provide data relating to the positions of the surface contacting device to data gathering device under the control of a computer. Apparatus for carrying out the method is also disclosed and includes a scanning head for moving the surface detecting device which may be a stylus or a probe relative to one axis, and preferably orthogonal axes. The head can include a set-up for inertia balancing the head and mass balancing the surface detection device. Also the head may include air bearings on which the stylus or probe are supported for oscillation. Surfaces to be scanned may be flat plates, cones, bores or other surfaces with compound angles.

36 Claims, 10 Drawing Sheets

FOREIGN PATENT DOCUMENTS

| | | |
|---|---|---|
| 3406045 | 8/1985 | Fed. Rep. of Germany . |
| 2298084 | 8/1976 | France . |
| 57-33301 | 2/1982 | Japan . |
| 58-205801 | 11/1983 | Japan . |
| 60-140110 | 7/1985 | Japan . |
| WO88/02843 | 4/1988 | PCT Int'l Appl. . |
| 1123344 | 8/1968 | United Kingdom . |
| 2004656 | 4/1979 | United Kingdom . |
| 2037436 | 7/1980 | United Kingdom . |
| 2094478 | 9/1982 | United Kingdom . |
| 2136573 | 3/1983 | United Kingdom . |
| 2139357 | 10/1983 | United Kingdom . |
| 2144860 | 3/1985 | United Kingdom . |
| 2167559 | 5/1986 | United Kingdom . |
| 2203837 | 10/1988 | United Kingdom . |

METHOD OF AND APPARATUS FOR SCANNING THE SURFACE OF A WORKPIECE

This is a continuation of application Ser. No. 07/555,464 filed as PCT GB89/01504 Dec. 16, 1989, now abandoned.

BACKGROUND OF THE INVENTION

The present invention relates to a method of and apparatus for scanning the surface of a workpiece.

A method of scanning is known, for example from U.S. Pat. No. 3,824,893, in which a mechanical probe is fixed on a machine spindle and the machine spindle traverses the surface of the workpiece either in straight lines in one of the x, or y directions, or in a curved path in the x, y plane, and after each line is completed the machine spindle moves the probe to a new position displaced from the completed line and repeats the movement along a parallel line.

This method is relatively slow since the whole machine is being moved backwards and forwards to build up the scanned area of the surface. Also the accelerations and decelerations of the machine introduce inaccuracies into the measurements due to bending of the machine parts during the accelerations and decelerations.

There is a need in the measuring field for a machine and an associated scanning apparatus which enables high speed continuous scanning of an area of a surface, with cheap interchangeable probes of different types.

SUMMARY OF THE INVENTION

According to the present invention there is provided a method of scanning a surface of a workpiece using a surface detecting device mounted on a support within a three dimensional reference framework, comprising the steps of:

producing relative movement between the support and the surface along a path whereby the surface detecting device passes over the surface, producing relative movements of the surface detecting device transverse to the instantaneous path direction, and bringing the surface detecting device into a pre-determined spatial relationship with the workpiece surface.

Preferably the method further comprises the steps of:

determining the positions of the support at a plurality of locations within the reference framework relative to a datum position;

determining the instantaneous positions of the surface detecting device relative to the support when the support is at each of said locations; and using the results of said determinations to determine the positions relative to said reference framework of a plurality of points on the surface being scanned.

The support may be a scanning head mounted on a machine which may be a measuring machine or a machine tool.

The method may be carried out manually or automatically under the control of a computer.

The pre-determined spatial relationship between the surface detecting device and the surface being scanned is to be understood as follows. In relation to a surface detecting device in the form of a non-contacting probe, e.g. an optical probe, a relationship in which the probe is at a distance from the surface which is within the operating range of the probe. In relation to a surface detecting device in the form of a work-contacting stylus alone, or mechanical probe including a work-contacting stylus, e.g. a trigger probe or an analogue probe, a relationship in which the stylus is in contact with the surface being scanned.

The relative movement between the support and the surface may be produced by moving the workpiece, the support or both.

The transverse movement may be an oscillating pivoting movement or an oscillating translating movement.

According to a preferred embodiment of the present invention a method of scanning a surface of a workpiece comprises the steps of:

mounting a motorised scanning head on a machine, mounting a surface detecting device on the motorised scanning head, driving the machine to produce relative movement between the surface being scanned and the motorised scanning head, operating the motorised scanning head during said relative movement to cause the surface detecting device to move transversely to the instantaneous direction of said relative movement, and, bringing the surface detecting device into a pre-determined relationship with the surface being scanned, By this means the machine can be operated in the manner which is most effective for the particular scanning operation being undertaken while the motorised scanning head, the inertia of which is low relative to that of the machine, produces the scanning action of the surface detecting device. For example, the machine may be moved at a relatively high but constant velocity along a line over the surface of the workpiece while simultaneously operating the motorised head to oscillate the surface detecting device transversely to the direction of movement of the machine.

This method will enable more rapid scanning to be carried out while eliminating errors from the machine which occur in conventional scanning operations due to inertia loads on the machine parts as the machine accelerates during changes of direction.

As an alternative method of operation, the machine may be moved over the surface of the workpiece relatively slowly at a non-constant velocity while the motorised scanning head causes the surface detecting device to traverse the surface to take measurements at points on the surface. In this method the errors due to the accelerations of the machine can be reduced while gathering data rapidly using high speed operation of the head which has much lower inertia loads.

Conventional machines will have transducers from which the instantaneous position of the head in a three-dimensional co-ordinate framework may be determined relative to a datum position The motorised scanning head also preferably has transducers from which the instantaneous position of the surface detecting device relative to the head may be determined. By collecting data from the transducers on the head and on the machine the positions relative to the reference framework of a plurality of points on the surface being scanned may be determined.

According to a specific aspect of the present invention a method of scanning the surface of a workpiece comprises the steps of mounting a surface detecting device on a motorised head, mounting the head on a machine spindle, moving the machine spindle at constant velocity over a surface to be scanned, simultaneously operating the head to cause the surface detecting device to traverse the surface of the workpiece transversely to the direction of motion of the spindle, and determining the positions of points on the surface being scanned relative to a datum position at a plurality of positions on each side of the direction of motion.

The head may be operable to produce pivoting or translational oscillatory movements of the surface detecting device transverse to the direction of motion of the machine spindle in two orthogonal directions whereby the surface sensing device may be made to follow a spiral, helical or other form of circular motion. Such operation enables the internal surfaces of bores or the external surfaces of circular discs to be scanned using the apparatus and method of the invention, and provides signals indicative of the co-ordinates of a plurality of points on such surfaces relative to a datum position in the reference co-ordinate framework.

According to another specific aspect of the present invention there is provided a method of scanning a cylindrical surface in or on a workpiece and having a longitudinal axis, the method comprising the steps of mounting a surface detecting device on a motorised head, mounting the head on a spindle of a machine, driving the head by means of the machine spindle along a line having at least a component of direction parallel to said longitudinal axis, and simultaneously operating the head to cause the surface detecting device to be oscillated transversely to said longitudinal axis in two orthogonal directions to be brought into a pre-determined relationship with the surface at successive spaced apart points thereon.

When carrying out the method of the invention in accordance with any one of the above-described embodiments in an automated manner, the movements of the support and the head are preferably made under the control of a computer. Such a computer may also control, or comprise of itself, data gathering means and the means for determining from the gathered data the required information about the surface being scanned.

The surface detecting device may be a mechanical probe, for example, a touch trigger probe or an analogue probe, including a stylus, a stylus alone, or a non-contacting probe, for example, an optical probe. Each will require different types of controls and will produce a variety of measurement signals for the data collection device to read. For example, the signals required for accurately determining the position of a probe stylus in a co-ordinate framework may be provided partly from the machine scales, partly from the head, and partly from the probe itself depending on the type of probe used.

Where the surface detecting device is a mechanical probe including a stylus, or a stylus alone, the motorised head may be required to pivot about a second axis for urging the stylus into contact with the workpiece surface.

The mechanical probe may be an analogue probe for example as described in our U.S. Pat. No. 4,158,919 or our International Application No PCT/GB89/01197, or a touch trigger probe (for example as described in our UK patent No. 1,445,977). Where an analogue probe is used the stylus may be urged into contact with the surface being scanned continuously throughout the scanning operation and the control means will instruct the data gathering means to read the signals generated by the probe indicative of the position of the stylus relative to the probe in addition to reading the signals produced by the transducers in the head, and the machine scales.

Where a touch trigger probe is used the stylus may be repeatedly withdrawn from and urged back into contact with the workpiece surface at pre-selected time or spacial intervals, whereby the probe sends a signal to the data gathering device to read the machine scales and the transducers in the head every time contact is made with the workpiece surface.

Where an optical probe is used the surface detection is provided by a beam of light which is directed onto the surface and the position of the surface is determined either by a triangulation technique or a focus detection method. In either case the probe outputs signals which must be read in conjunction with the position sensing transducers in the head and the machine scales at the same pre-selected time or spacial intervals.

A potential source of errors from the method of scanning according to the invention is that the transverse movement of the surface detecting device may be applied to the machine spindle from the motorised head during the scanning operation. If the rigidity of the machine is not particularly high, such movement may produce vibrations in the machine and thus reduce the accuracy of the information produced.

According to another aspect of the present invention a scanning head for use in scanning the surface of a workpiece comprises:

means defining an axis, a surface detection device mounted on the head, for movement relative to said axis, drive means for producing movement of the surface detecting device relative to said axis, and means for reducing the effect on the machine of the reaction forces produced in the head as a result of said movement of the surface detecting device.

The drive means in the head are preferably electric motors of the type which produce a constant torque for a given input current.

The means for reducing the effect on the machine of the reaction forces produced in the drive means are preferably a mass within the head which is rotationally accelerated to produce a torque reaction which is equal and opposite to the torque reaction produced by the moving parts of the drive means.

Where the drive means is an electric motor, those normally static parts of the motor which react the torque produced by the motor may be mounted for rotation to balance the torque reaction of the motor so that substantially no reaction forces are transmitted to the machine.

The head preferably includes air bearings for substantially frictionless operation. This not only increases the speed at which the head can operate but minimises the frictional forces to be overcome in operating the apparatus and hence the forces which may be transmitted back to the machine spindle.

According to another aspect of the invention a scanning head for use in scanning the surface of a workpiece comprises:

a fixed part and a movable part;

an air bearing on which the movable part is supported and which defines an axis of movement for the movable part, a surface detecting device carried by the movable part, and drive means for causing movement of the movable part relative to said axis to position the surface detecting device relative to the surface to be scanned.

The head can however, be made to operate with other types of bearings, but where friction in the bearings is significant the stylus may bend under the combined effects of the torque from the motor and friction in the bearings. This bending will create errors in the measurements of the surface if not allowed for. In this case, when using a mechanical stylus as the, or part of the, surface detecting device it may be advantageous to include strain gauges to determine the bending of the stylus so that this information can be used to correct the measurements of the surface.

Also according to the present invention a scanning head for use in scanning the surface of a workpiece comprises:

a base for connection to a machine, a first rotatable part supported on the base for rotation about a first axis, a second rotatable part supported on the first rotatable part for rotation about a second axis orthogonal to the first axis, a surface detecting device secured to the second rotatable part, and drive means causing rotation of the first and second rotatable parts, wherein the drive means are constant torque motors which are operable as positioning and/or bias motors to maintain the surface detecting device in a pre-determined relationship with the surface being scanned and to oscillate the surface detection device over the surface.

BRIEF DESCRIPTION OF THE DRAWINGS

Examples of apparatus and methods of operation thereof according to this invention will now be described with reference to the accompanying drawings wherein.

DESCRIPTION OF THE PREFERRED EMBODIMENT

Figure 1:
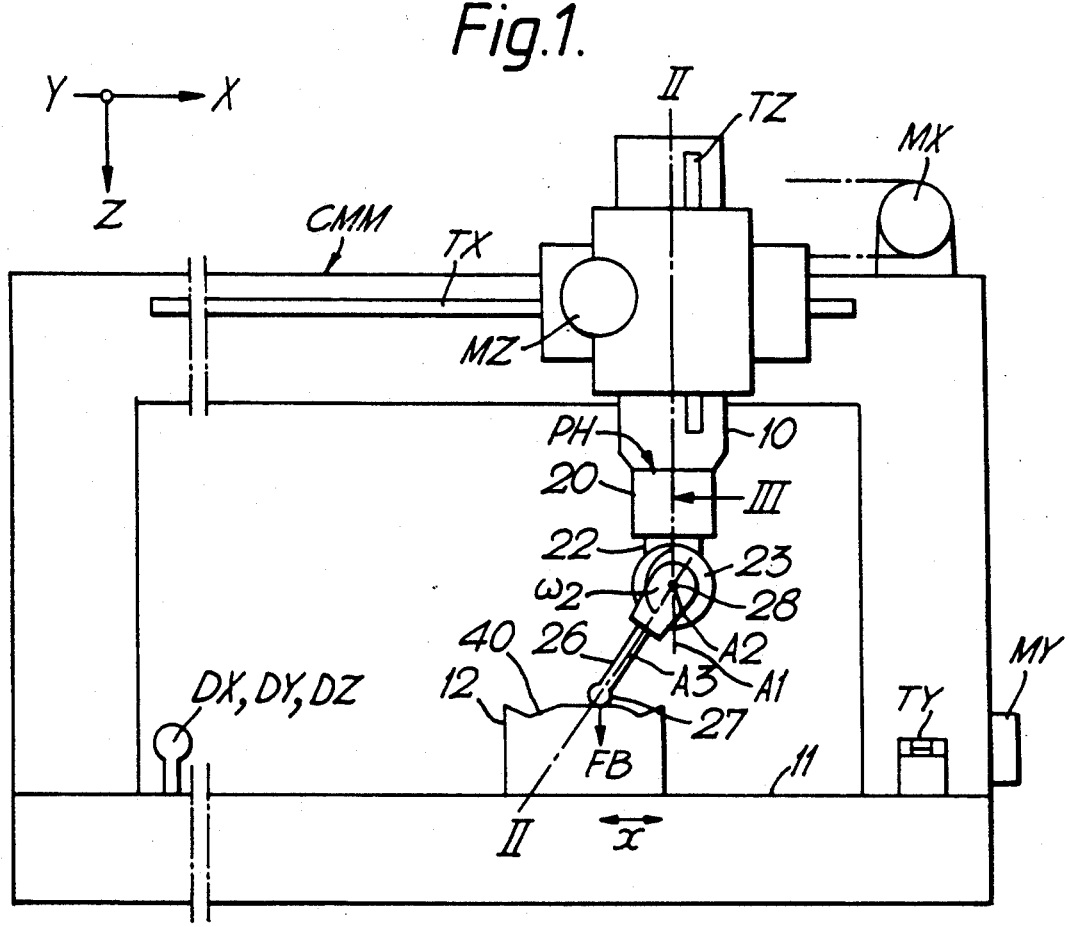
FIG. 1 is an elevation of a co-ordinate measuring machine including scanning apparatus according to the present invention.
Figure 3:
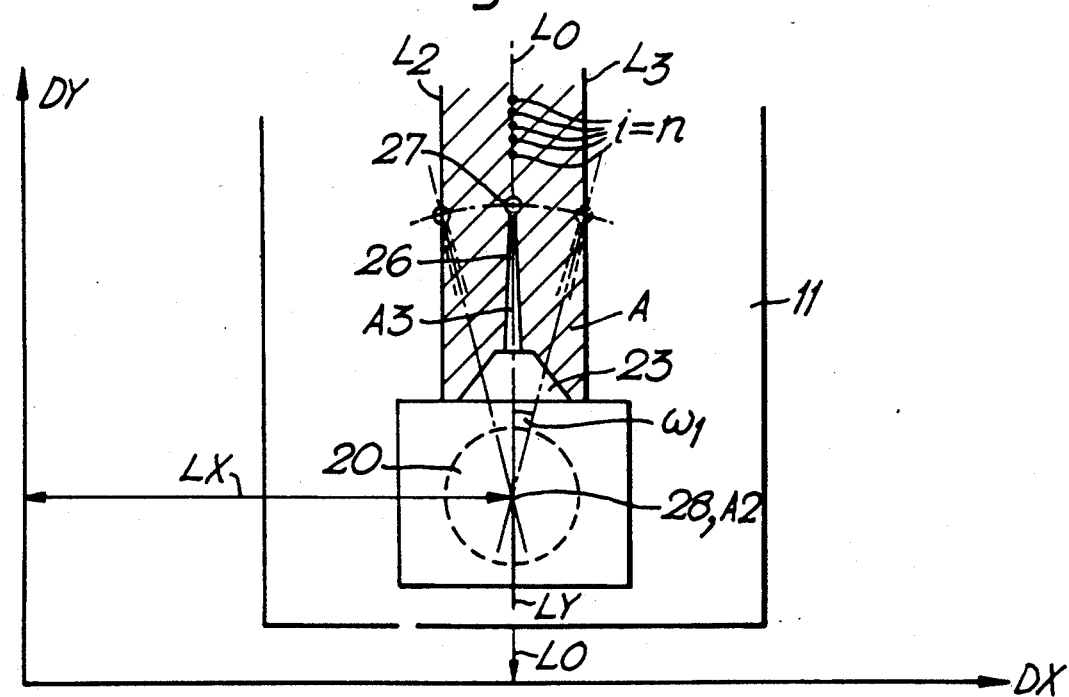
FIG. 3 is a part plan view of FIG. 1 showing a typical scanning operation.
Figure 2:
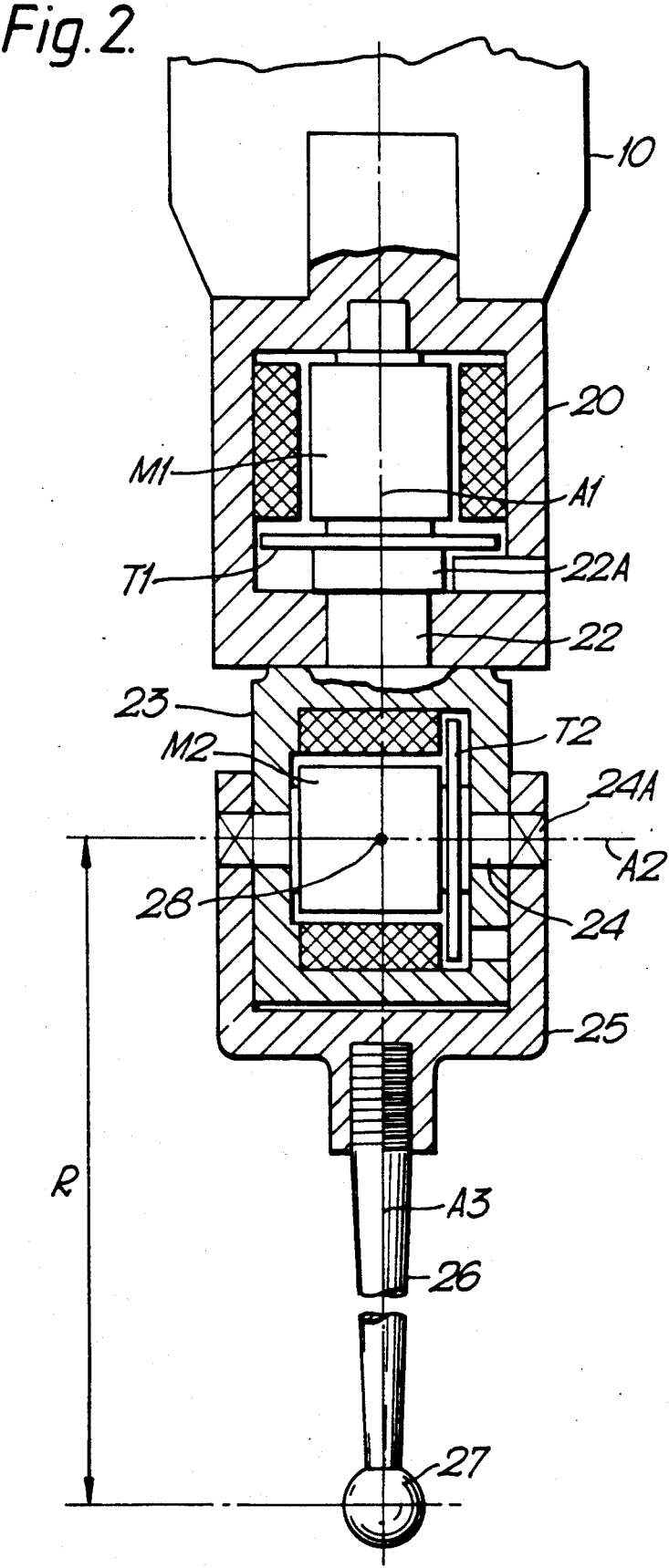
FIG. 2 is a section on the line II—II in FIG. 1 and shows in diagrammatic form details of the stylus mounting.

Referring to FIGS. 1 to 3, a co-ordinate measuring machine CMM comprises an operating member 10 supported on a table 11 for translatory movement in the three orthogonal directions X,Y,Z of a cartesian co-ordinate system. The member 10 is drivable in the directions X,Y,Z by respective motors MX,MY,MZ in a manner known per se relative to the table 11 on which a workpiece 12 is mounted. The operating member 10 has secured thereto a motorised scanning head PH comprising a fixed part formed by a base or housing 20 supporting a movable part in the form of a shaft 22 rotatable by a motor M1 relative to the housing 20 about an axis A1. The shaft 22 is secured to a further housing 23 supporting a shaft 24 rotatable by a motor M2 relative to the housing 23 about an axis A2 perpendicular to the axis A1. Housing 23 and shaft 24 can be regarded as the fixed and movable parts of the lower point of the head. The shafts 22,24 are supported for rotation in respective bearings 22A,24A in the respective housing 20,23. The bearings 22A and 24A are preferably air bearings (known per se) which utilise a supply of air (not shown) provided by the machine. The shaft 24 has secured thereto a frame 25 to which is secured a surface detecting device in the form of a stylus 26 having an axis A3 perpendicular to the axis A2. The stylus 26 has a free end defined by a spherical sensing element, or surface contacting tip, 27, and a supported end defined essentially by the axis A2. The axes A1,A2,A3 preferably have a common point of intersection 28, and in this particular example axis A1 is aligned with the Z axis of the machine, while the axis A2 is aligned with the Y axis of the machine. The head PH thus constitutes a support on which the stylus is mounted.

The arrangement is such that the motors M1,M2 can position the sensing element or tip 27 angularly about the axes A1 or A2, and the motors MX,MY,MZ can position the head PH or, more specifically, the point 28 linearly anywhere within the three-dimensional co-ordinate framework defined by the operating field of the machine CMM to bring the surface detecting device into a pre-determined relationship with the surface being scanned. Linear position transducers TX,TY,TZ (known per se) are provided for measuring linear displacement LX,LY,LZ of the member 10 in the respective directions X,Y,Z as is well known. Angular position transducers T1,T2 are provided for measuring angular displacements W1,W2, of the stylus 26 about the respective axes A1,A2, i.e. relative to the member 10. The motors MX,MY,MZ,M1,M2 are also collectively referred to by the letter M, and the transducers are collectively referred to by the letter T.

The transducers T thus provide data for determining the position of the support PH within the reference framework and for determining the instantaneous position of the surface detecting device 26 relative to the support.

Figure 4:
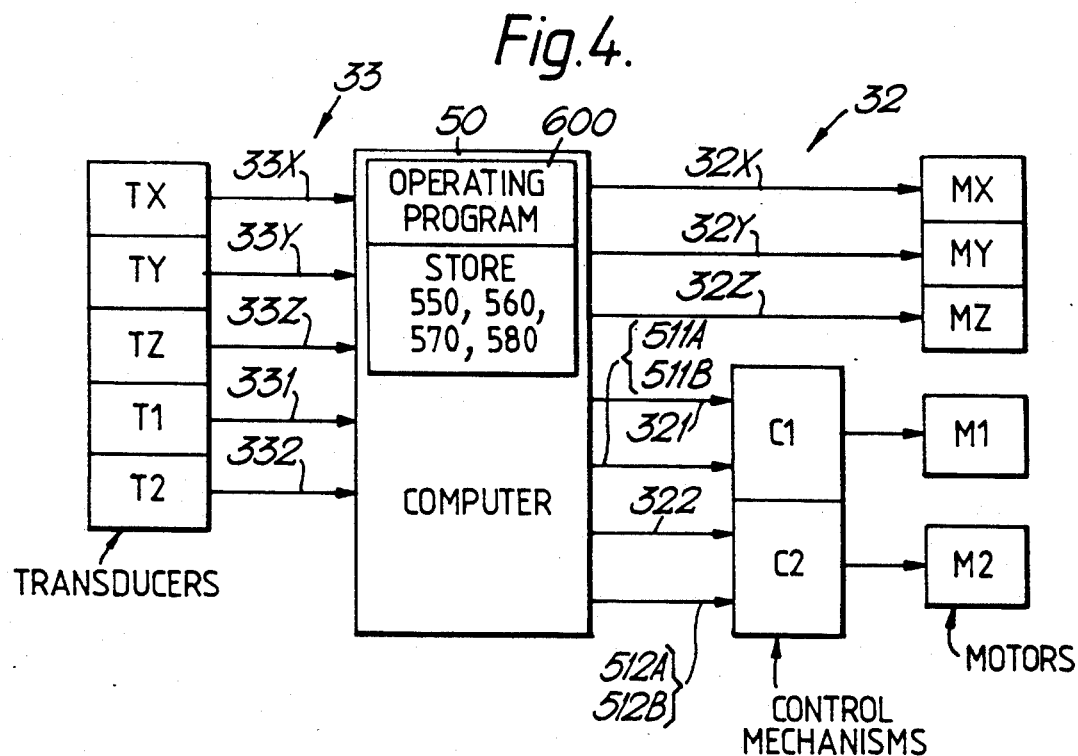
FIG. 4 is a diagram of the overall operating system of the machine shown in FIG. 1.

A control means, for example, computer 50 (FIG. 4) is programmed to output drive signals 32X, 32Y, 32Z, 321, 322, collectively denoted 32 for driving the respective motors M thereby to position the stylus 27 relative to the workpiece 12, position feedback signals 33X, 33Y, 33Z, 331, 332, collectively denoted 33, being provided from the respective transducers T. The computer 50 thus also acts as a data gathering means.

The motors M1 and M2 are adapted to be constant torque devices and are operable to move their respective rotors to a given angular position, and hold the rotors in that position, or to apply to their rotors a substantially constant torque for a given input current. Thus the motors M1,M2 are operable in two modes, viz the positioning mode and the constant torque or bias mode.

For the scanning operation shown in FIG. 3 in which an external surface of the workpiece is to be scanned generally in the x,y plane, the machine drives the head to move along a straight path or line L0. During the movement of the head the motor M2 is operated in the bias mode and the motor M1 is operated in the positioning mode. Thus motor M2 applies a given torque to the stylus 26 resulting in a force FB between the tip 27 and the workpiece 12, while motor M1 drives the frame 25 transversely to the instantaneous path direction L0 to position the element 27 in a plurality of locations on the workpiece surface between the limits L2 and L3. Thus the stylus covers an area A of the surface. In order to cover the complete surface, the scanning operation must be repeated a sufficient number of times over different areas.

During the scanning operation, if there is relative movement between the head PH and the workpiece 12 in the sense of reducing the force FB, and, instantaneously the torque FBx on the stylus, the motor M2 moves the stylus 27 to maintain the torque and increases the angle W2. If the device PH is moved in the sense of increasing the force FB, the motor M2 accommodates that movement by adjusting the angle W2 to maintain the torque. In other words, the stylus is pivotal about the axis A2 both in response to and in opposition to the bias torque of the motor M2. Clearly if the stylus were to move relative to the head PH due to collision with a feature on the surface of the workpiece, or some other obstruction the motor M1 will accommodate the movement providing a degree of crash protection for the stylus.

In some scanning operations, i.e. surface form scanning, where it is necessary for the stylus to follow the surface contours accurately the torque required to be applied to the stylus may be sufficient to cause bending of the stylus. By using air bearings in the head however there will be minimal resistance to the pivoting motion of the stylus in reaction to the changing of the force FB as the contours of the surface change. Thus there is no significant bending of the stylus due to bearing friction when air bearings are used and the errors in the position measurement of the surface due to stylus bending can be calibrated and allowed for or may be reduced to second order importance and may be neglected If other bearings are used in which friction is significant it may be necessary to take account of stylus bending errors on the measurement using stain gauges on the stylus as described in relation to other embodiments below.

Figure 5:
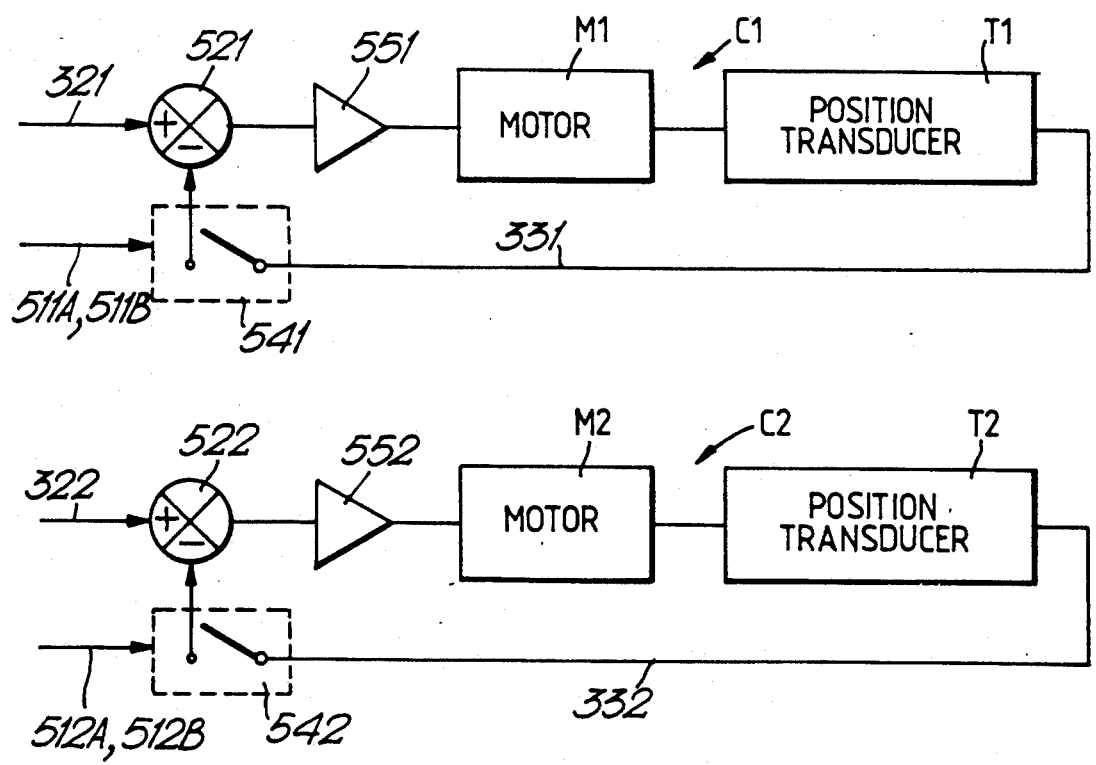
FIG. 5 is a detail of FIG. 4 and shows diagrammatically the motors and transducers in the head.

Referring to FIG. 5, the computer 50 is arranged to control the motors M1,M2 which are DC motors, through respective control systems C1,C2 to which the drive signals 321,322 are connected as demand signals and wherein the feedback signals 331,332 are connectable to the signals 321,322 through summing junctions 521,522. This connection of the feedback signals 331,332 is effected through respective mode control switches 541,542. The computer 50 generates respective mode control signals 511A,511B and 512A, 512B for operating the respective switches 541,542. The arrangement is such that if either of the signals 511A,512A is output, the respective switch 541,542 is closed and the respective motor M1,M2 is operated in the positioning mode, but if either of the signals 511B,512B is output the respective switch 541,542 is opened whereby the respective motor M1,M2 is deprived of the position feedback signal 321,322 and therefore operates in the bias mode. The systems C1,C2 have preset gain amplifiers 551,552 for the feed forward signal so as to limit the torque of the motors to a preset value.

In order to control the scanning operation a computer programmer has to set up certain initial data which is passed to a data gathering means which in this example is the computer memory.

From prior knowledge of the general size, shape and position of the workpiece 12 within the cartesian co-ordinate framework of the machine, the computer programmer determines initial data 550 including but not limited to the following:

i) the line L0 in the x,y plane along which the machine will drive the head 20 over the workpiece, ii) the desired initial force FB between the stylus element 27 and the workpiece 12 and the desired torque of the motor, iii) the height $Z_i$ above the general workpiece plane at which the head 20 must be driven in order that the motor M2 can maintain the desired torque constant within a reasonable range of angles W2, iv) the width of the area A over which the motor M1 will sweep the stylus element 27 in order to gather the required data, v) the best mode of machine operation for the most effective scanning of the particular surface i.e. constant velocity or slow non-constant velocity.

The determination of the initial data for a line such as the path L0 is well known per se. Also known is the organisation of a machine such as the machine CMM for driving an operating member through such a line. Therefore, these aspects are not specifically described other than saying that, in the present example, the data 550 comprise the orthogonal positions of the point 28 relative to a datum DX,DY,DZ at given spatial intervals between points $i=o$ and $i=n$ (FIG. 3) on the desired line. Further, the programmer determines position data 560 being values for the signals 321,322 whereby the stylus 26 is moved into a neutral position in which it is clear of the workpiece 12 even when the member 10 is at its starting position $i=o$ for the scanning operation. This ensures that the member 10 can be moved into the starting position $i=o$ without danger of collision between the stylus and the workpiece. Next, the programmer determines position data 570 being values for the signals 321,322 whereby the stylus 26 is moved into a starting condition for the scanning operation, that is, the condition in which the sensing element 27 can engage the workpiece. The data 560,570 include the signals 511A,511B and 512A,512B as will become apparent later herein. The programmer also determines the radius R of the stylus and the diameter of the stylus ball 27. The data 550,560,570 and R are transferred into the computer store in the usual way.

Regarding the execution of the scanning operation, the point 28 is assumed, initially, to have a position in which the member 10 is well clear of the workpiece. For the operation itself the computer contains a program 600 written to perform the following operations:

The scanning head is driven to the starting point of the scanning operation i=o on line L0 at height Zi.

With motor M1 set to the positioning mode and motor M2 set to the bias mode, motor M2 is operated to bring the stylus ball 27 into contact with the surface of the workpiece 12 with the required initial force which sets the datum torque for the motor M2.

Drive the motors MX, MY, MZ to move the head PH along line L0 while simultaneously driving motor M1 to oscillate the stylus to either side of line L0 between the limits L1 and L2.

At positions i=1 to i=n read the outputs of the transducers T and calculate the instantaneous values of the X,Y and Z co-ordinates of the ball at each position of the machine sending the values to the memory store.

It is to be noted in this example that the computer 50 performs the functions both of controlling the scanning operation and data gathering.

Figure 8:
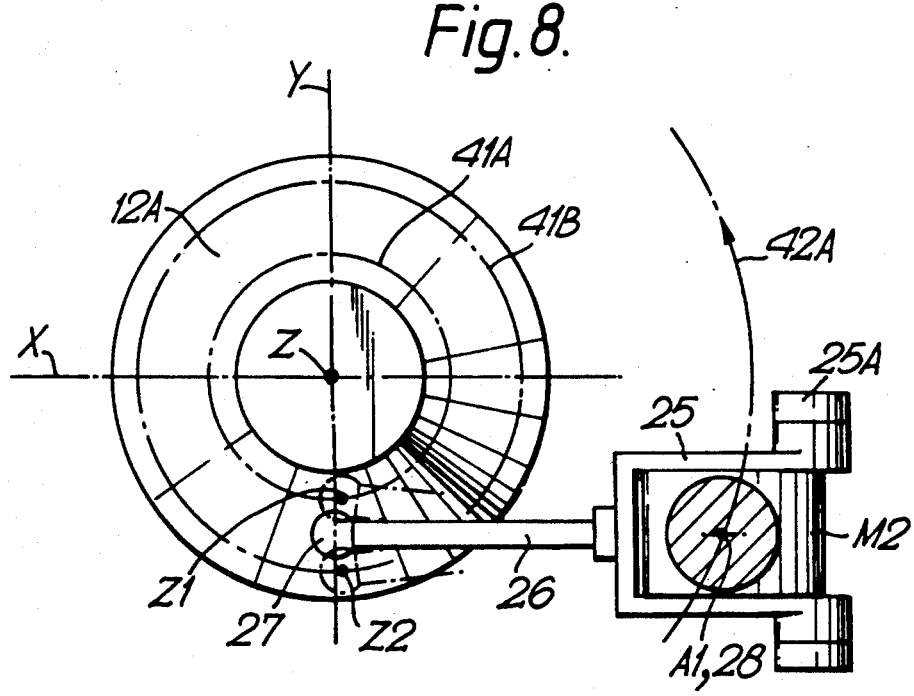
FIG. 8 is a plan view of FIG. 7.

The velocity of the machine movement is preferably constant to avoid the errors caused by accelerations and decelerations of the machine For generally planar surfaces this can give rapid and accurate data gathering Alternatively where the shape of the surface so dictates it may be necessary to drive the machine along a path such that it is not possible to maintain a constant velocity (see FIG. 8 below).

The computer may determine the frequency at which the transducers T are read on a time basis as an alternative to a spatial basis.

Figure 6:
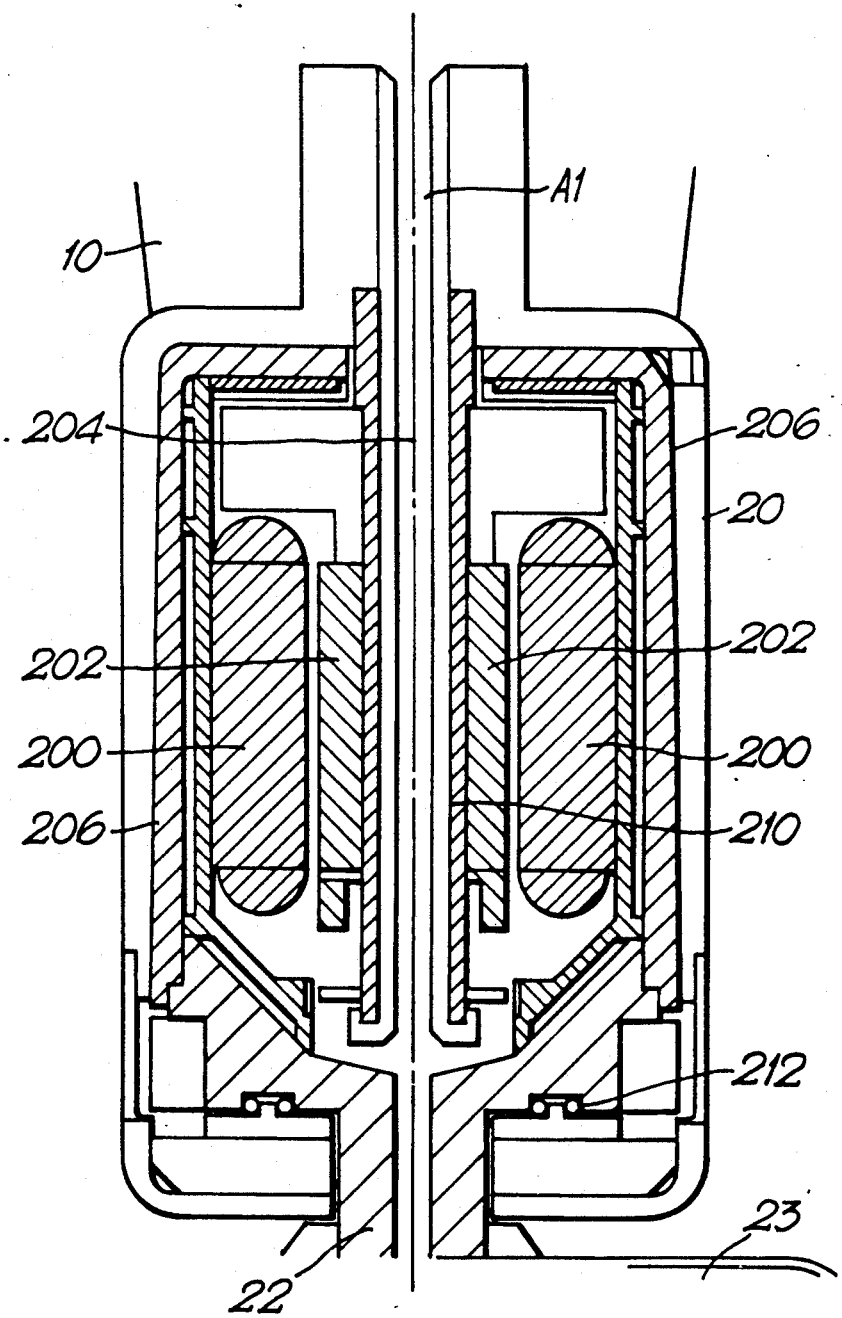
FIG. 6 is a sectional elevation through part of a scanning head of the present invention illustrating in more detail a mechanism for balancing the reaction forces in one of the motors.

The oscillating movement of the surface detecting device could, in some circumstances, cause vibrations to be transmitted to the machine spindle. FIG. 6 illustrates a modification to the head shown in FIG. 3 to overcome this problem. Where applicable the same reference numerals as used in FIG. 3 are used to refer to the same or similar parts in FIG. 6.

Only the top part 20 of the head is shown in FIG. 6, it being understood that the bottom part 24 should be modified in exactly the same way.

Referring now to FIG. 6, the housing 20 is attached to the quill 10 of the machine. Motor M1 has two contra rotating parts 200 and 202 respectively Power from the machine is fed by cables through a central duct 204 to part 200 which is rotatable about axis A1, on the air bearing 206, which includes a thrust flange 208, supported in the housing 20. Part 200 carries the housing 23 containing motor M2 by means of shaft 22. Air for the air bearing is fed through duct 204 and onto the bearing surfaces through appropriate drillings (not shown).

The other part 202 of the motor (which would normally be held static) is mounted on a further bearing 210 so that when the motor is operated to rotate the part 200, the reaction through the motor windings will rotate the part 202 in the opposite direction. By this means normally no reaction forces would be transmitted to the motor housing and no vibrations would be transmitted to the quill when the motor M1 is used to oscillate the housing 23.

However, because motor M1 is a constant torque motor, the bearing 210 is arranged to provide some friction to provide resistance to the rotation of the part 202 when the motor is operated in the bias mode, to prevent part 202 from overspeeding in reaction to the constant torque on part 200. Thus some minimal vibration may be passed to the machine due to this friction when the motor M1 is oscillating in the positioning mode.

The head includes a further bearing 212 for shaft 22. Transducer T1 is present in the form of encoder disc 214 and read head 216. The remaining features of this embodiment of the head are not described in detail.

It is to be understood that motor M2 is similarly formed in two contra rotating parts in order to minimise vibrations transmitted to the machine when it is operated in the positioning mode.

Figure 7:
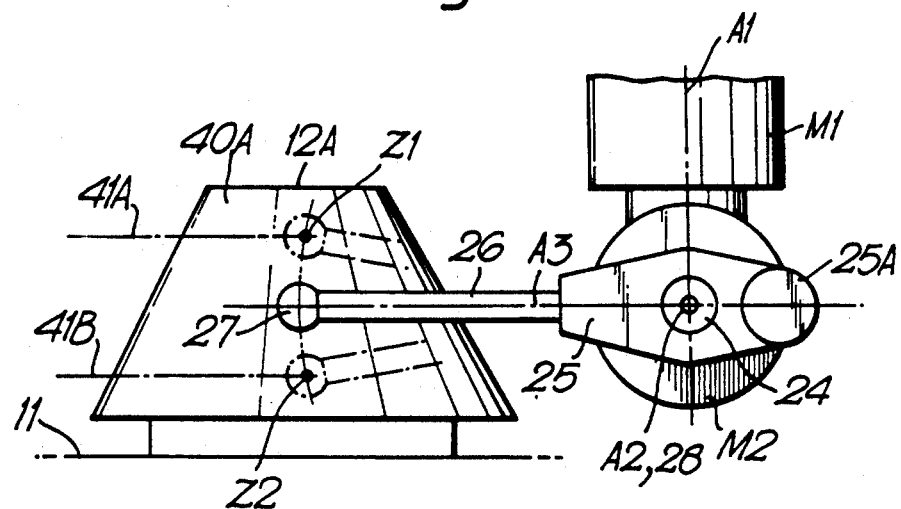
FIG. 7 illustrates a further scanning operation according to the invention.

Other workpiece surfaces may be scanned with the apparatus of the present invention. For example (see FIGS. 7 and 8) the surface 40A of a cone may be scanned by mounting it on the table 11 with its axis vertical, i.e. parallel to the Z direction. The motors M of the machine may be arranged to drive the stylus 26 past the surface 40A in, say the X direction at constant velocity, while the motor M1 operates in the bias mode to urge the stylus into contact with the surface and the motor M2 acts in the positioning mode to cause oscillation of the stylus in the Z direction between positions Z1 and Z2. In this way a small patch of the surface may be scanned at a time between planes 41A and 41B.

Alternatively (see FIG. 8) the motors MX and MY are driven to move the point 28 through a circular path 42A while motor M1 operates in the bias mode and motor M2 operates in the positioning mode. By this means the tip 27 can be maintained in contact with the surface at planes 41A,41B while the scanning head PH is driven completely around the surface of the workpiece. While such operation is not conducted at constant velocity because of the circular path of the head, the motors MX and MY should be controlled by the computer 50 to minimise the inertia forces on the machine, e.g. by driving the head around the path 42 at constant speed.

The computer is programmed by the programmer to ensure that the readings of the transducers T are fed to the data gathering means i.e. the computer memory, at regular intervals preferably, as in the embodiment described in FIG. 3 at spacial intervals i=o to i=n around the path 42A.

The stylus 26 is preferably balanced by a balance mass 25A secured to the stylus holder 25 thereby to reduce the power requirement to the motor M2. Clearly other forms of mass balancing may however be used.

In a further modification of the invention the constant torque may be applied to the stylus 216 by a spring instead of a constant torque motor.

The simple control system described above which arranges for a bias force to be applied to the surface detecting device in a direction normal to local surface plane, and a positioning force to be applied to the surface detecting device at right angles to the bias force, is satisfactory for surfaces where significant areas can be arranged to lie in a plane.

If however, the surface lies at an angle to both motor axes, the motors may both have to be operated in both the bias mode and the positioning mode simultaneously. Hence the control system will operate to supply current to both motors to achieve both a substantially constant stylus pressure normal to the workpiece surface and translation of the surface detection device across the workpiece surface.

It is also to be understood that a non-contacting probe, for example, an optical probe may be substituted for the stylus 26. In this case there will be no need for motor M2 to operate in the bias mode and it may be locked in position, or operated in positioning mode to provide complex motions of the head.

Also the stylus may be substituted by a mechanical probe, for example, an analogue probe or touch trigger probe to provide more detailed information of the surface. The outputs of the probes will then need to be read in addition to those of the machine and head thus giving rise to more complex data analysis requirements.

In all of the scanning operations described above and hereinafter, the computer is programmed to use the data collected from the various transducers during the operation, and to use it in conjunction with the initial data fed in by the programmer, to determine the co-ordinates of points on the surface of the workpiece in the reference framework relative to the datum point.

FIGS. 9 to 19 illustrate a method of bore scanning using the present invention.

Figure 9:
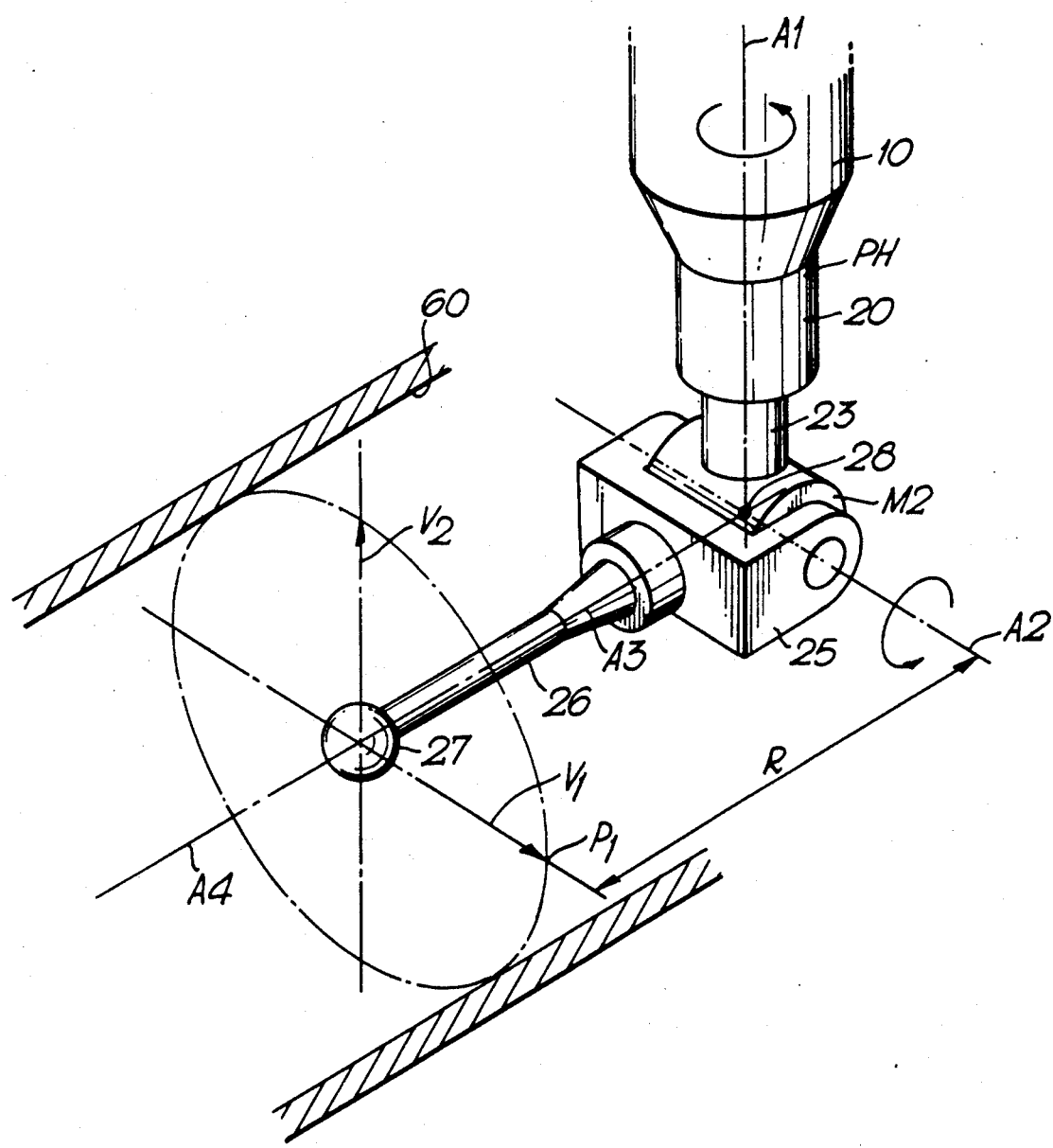
FIG. 9 is a perspective view of the mounting apparatus in FIG. 2; in a bore.
Figure 10:
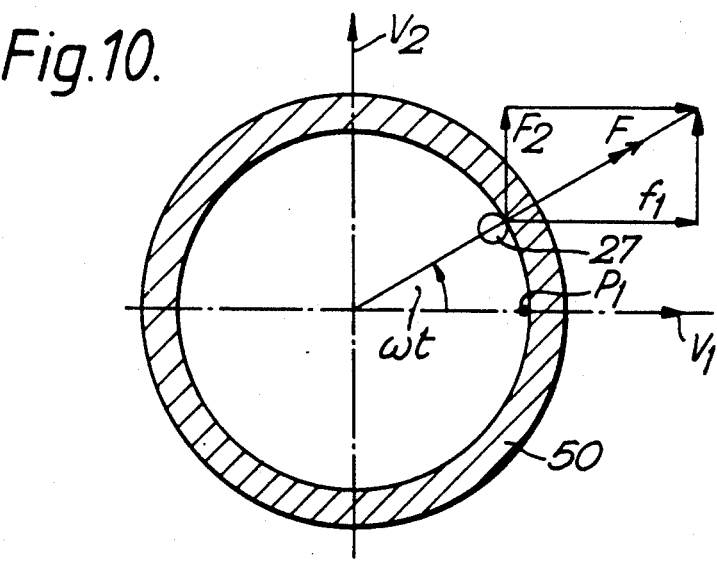
FIG. 10 is a diagram of a scanning operation according to an embodiment of the present invention.
Figure 11:
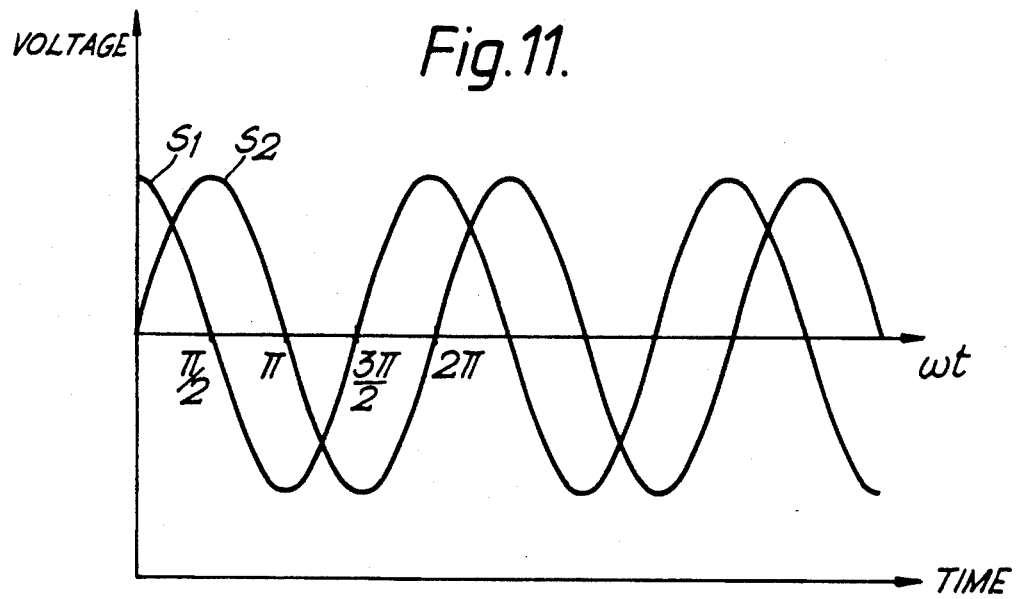
FIG. 11 is a graph showing the inputs to the motors M1 and M2 for the scanning operation shown in FIG. 10.

Referring to FIGS. 9 to 11 the probe head PH is positioned so that point 28 lies on the axis A4 of cylindrical bore 60 and axes A1,A2 and A4 are orthogonal (this can be seen most clearly in FIG. 9). For the sake of simplicity, such a relationship between the axes A1,A2 and A4 will be assumed to exist in all examples relating to bore scanning unless stated otherwise. The stylus is then moved in the direction of vector V1 into contact with the surface of the bore 60 at position P1. Currents S1,S2 (FIG. 11) are then applied to motors M1,M2 respectively and the appropriate motors of the machine are started to drive the probe head in the direction of the axis A4 at a constant velocity. At the instant the currents S1,S2 are applied, the current S1 is a maximum whereas the current S2 is zero. This means that the torque produced by motor M1 is a maximum and that motor M2 produces no torque at all. Thus, at this instant the stylus is urged against the surface of the bore in the direction of vector V1. As current S2 increases, the torque from motor M2 (in a direction parallel to vector V2) increases while torque from motor M1 decreases, and the stylus 26 will move relative to the surface of the bore 60 while remaining in contact with the surface. As the stylus 26 moves round toward the position represented by the angle wt=90° (FIG. 10) the force F1 acting parallel to vector V1 will decrease and the force F2 acting parallel to vector V2 will increase in accordance with the decrease and increase in the current S1 and S2 respectively. At the position represented by wt=90°, F1 has decreased to zero and F2 is maximum, acting along the direction of vector V2. It can be seen from FIG. 11 that the current S1 becomes negative after wt=90°. Thus when wt>90° (and of course wt<270°) the motors M1 will apply torque in the reverse direction (anti-parallel to vector V1) and the force F will act in the reverse direction. Another change of direction occurs in respect of force F1 at wt=270°; force F2 changes direction at wt=0° and 180°. Thus, by driving motor M1 with a current which varies as a cosine wave, and motor M2 with a current which varies as a sine wave, the stylus can be driven around the circumference of the bore 60 without losing contact with the surface. Since the head is also moving along the bore during the scanning operation the stylus will travel with a helical motion over the bore surface to gather data about the surface along the length of the bore.

It should be noted that although the magnitudes of the applied forces F1,F2 vary sinusoidially, the resultant applied force F has a constant magnitude, and always acts radially. This is desirable because the stylus will inevitably deform when it is urged against the surface of the bore, and therefore the position transducers T1,T2 will output angular displacement data W1,W2 which represents an angular displacement slightly larger than the actual displacement of stylus ball 27 from axis A4. This error can be calibrated out of the system, by measuring the bending of the stylus 26 for a given force. However if the force varies either in magnitude or direction during scanning then the stylus bending will also vary and the error due to the stylus bending cannot be calibrated out of the system.

The stylus will also deform tangentially to the surface of the bore 60, due to friction between the stylus ball 27 and the surface of the bore 60. However, provided the tangential deformation can be kept constant this deformation is not as serious as the deformation due to the radial force F, since the component of deformation in a radial direction due to the tangential deformation is small. One way of overcoming any problems due to tangential deformation is to mount the stylus ball 27 on bearings so that it rolls around the surface of the bore. (Another method of dealing with tangential deformation is described subsequently).

Another method of scanning the bore using a stylus as a surface detection device is to scan at a constant angular velocity, this may be performed with a position control servo mechanism. Because, during scanning at a constant angular velocity the force on the stylus may vary, means may be provided on the stylus, for example, a strain gauge array (not shown) to detect the bending of the stylus. The strain gauge array would typically comprise three strain gauges arranged so as to detect strain in three orthogonal directions; usually axial stylus strain is ignored because it is small.

The basic principle of constant velocity scanning is that the stylus is driven around the surface of the bore at a constant angular velocity by the position control servo, while the strain gauge indicates the stylus deflection (i.e. bending) at any instant in time. A correction to the position of the stylus as indicated by the transducers T at any given instant in time can thus be made in accordance with the value of strain gauge output at that instant. This operation may be carried out after a scanning operation has been completed, by referring back to the strain gauge deflection data recorded during the operation, or in real time.

The simplest example of bore scanning at a constant angular velocity is as follows. Motor M1 is positioned with its axis A1 coincident with the bore axis A4. A constant current (generating a constant torque) is supplied to motor M2 to drive the stylus 26 into contact with the bore surface, and motor M1 is then driven through a 360° rotation by a position control servo. The transducer and machine outputs are read in the normal way. It should be understood that this is an illustrative example, and that in practice, it is unlikely that the axes A1 and A4 can be brought into coincidence Thus generally, the position control servo will have to control both M1 and M2 in an appropriate manner having regard to the relative orientation of the probe head PH and the bore 60.

Figure 12:
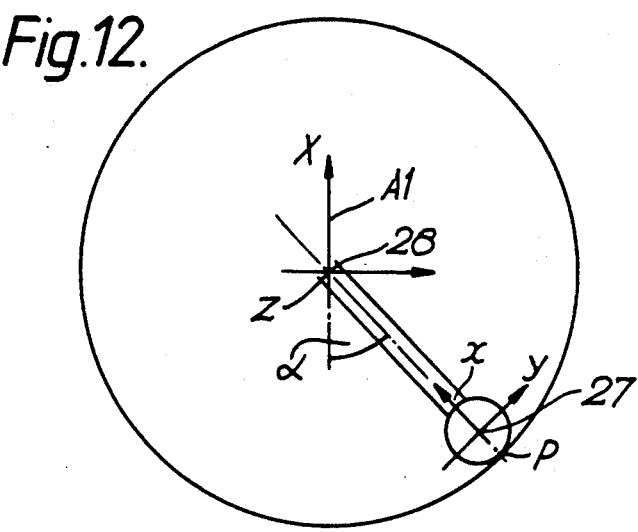
FIG. 12 is a diagram of a scanning operation according to a second embodiment of the present invention.
Figure 13:
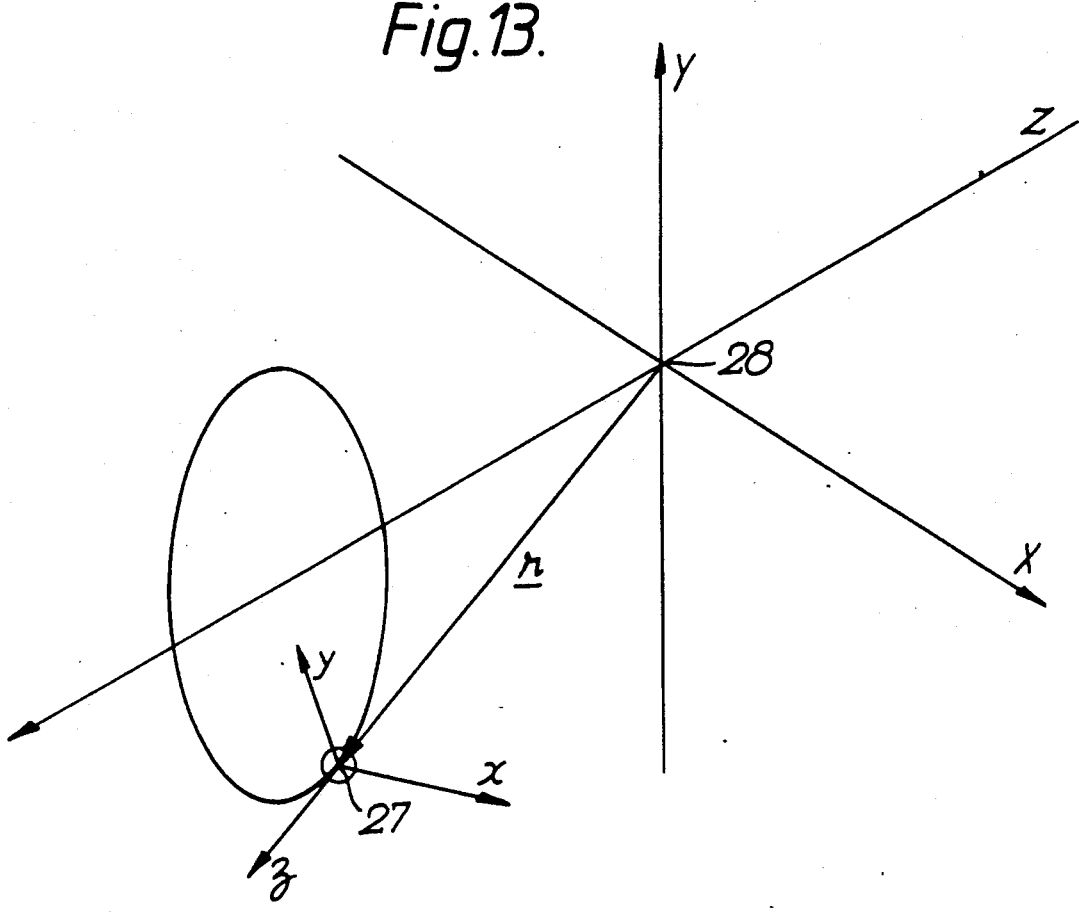
FIGS. 13 and 14 are mathematical representations of two co-ordinate systems used in employing the present invention.
Figure 14:
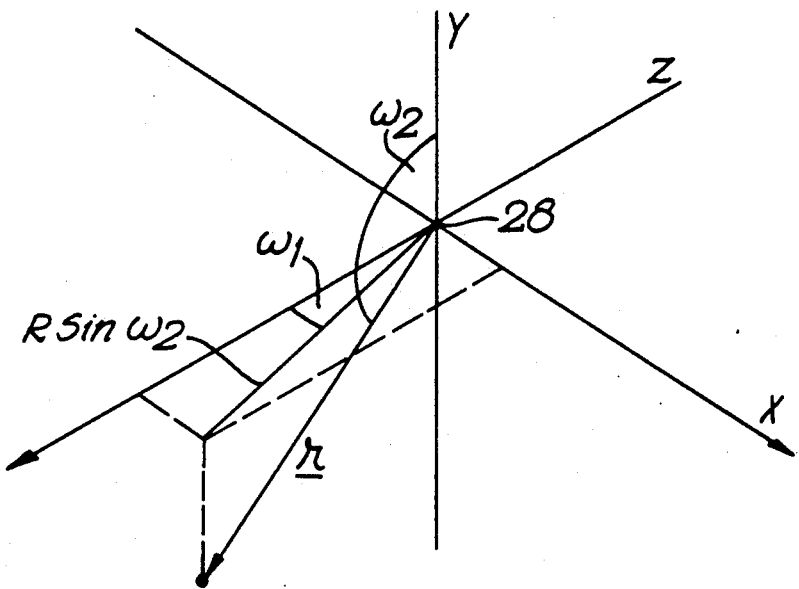

The correction of the stylus position using the strain gauge deflection data (required when the force on the stylus varies during a scanning operation) will now be described with reference to FIGS. 12, 13 and 14. Referring first now to FIG. 12, the stylus is inclined at an angle $\alpha$ to the axis A1 and has a displacement in the reference frame of the probe head PH denoted by the co-ordinates x,y,z. These values can be obtained using known transformations from polar co-ordinates to rectangular co-ordinates. However, due to stylus bending there is a displacement of the stylus ball 27 $\delta x, \delta y, \delta z$ from the position given by the output of the transducers T1 and T2. The degree of the deflection of the stylus can be calculated from the output of the strain gauges on the stylus. However, this output is an output in the reference frame of the stylus tip. Thus, a transformation of the stylus co-ordinate system into the probe head co-ordinate system is required. This then yields deflection of the stylus ball 27 (i.e. the stylus bending) in the reference frame of the probe head, and the values $\delta x, \delta y$, and $\delta z$ may be summed with the co-ordinates x,y and z to obtain the true position of the stylus ball. The transformation is carried out as follows:

Referring to FIGS. 13 and 14, the reference frame of the probe head PH is defined by axes X,Y,Z and the co-ordinates of the stylus ball 27 in the reference frame of the probe head are expressed in terms of axes x,y and z. Because of the geometry involved however, it is more convenient to use spherical polar co-ordinates $(R, W_1, W_2)$. Where:

R is the length of the stylus from intersection point 28, $W_1$ is the angle of displacement of the stylus normal to the Y,Z plane $W_2$ is the angle of displacement of the stylus from the Y axis $x = R \sin W_2 \sin W_1$
$y = R \cos W_2$
$z = R \sin W_2 \cos W_1$ For the purposes of the transformation we define unit vectors i, j and k which point in the direction of the X,Y and Z axes respectively, and unit vectors l,m and n which point in the directions of axes x,y and z respectively.

To transform the x,y and z co-ordinates of the stylus into the X,Y,Z reference frame it is necessary to express l,m and n in terms of i,j and k.

An example of such a transformation is the expression of n in terms of i, j and k:

n points in the same direction as position vector r which defines the position of the stylus ball 27.

$$\therefore n = r/|r| = r/R$$

$$r = R[\sin W_2 \sin W_1 \, i + \cos W_2 \, j + \sin W_2 \cos W_1 \, k]$$

$$\therefore n = \sin W_2 \sin W_1 \, i + \cos W_2 \, j + \sin W_2 \cos W_1 \, k.$$

Although the magnitude of the torque applied to the stylus by the motors M1 and M2 can be kept at a substantially constant value, the forces acting on the stylus by virtue of its contact with the workpiece surface may vary. This is because the resultant force on the stylus due to its contact with the surface of the workpiece is a function of both the torque applied to the stylus, and the frictional resistance to movement of the stylus across the surface of the workpiece. In order to keep the forces acting on the stylus as constant as possible, it may be desirable to vary the torque applied to the stylus by the motors M1 and M2 in such a way as to keep the stylus bending (as sensed by the strain gauge array) at a constant value throughout the scanning operation. A method of scanning which controls the probe head in this way will now be described with reference to FIGS. 15 and 16. Although illustrated as a method of bore scanning, this particular method is applicable to all types of scanning.

Figure 15:
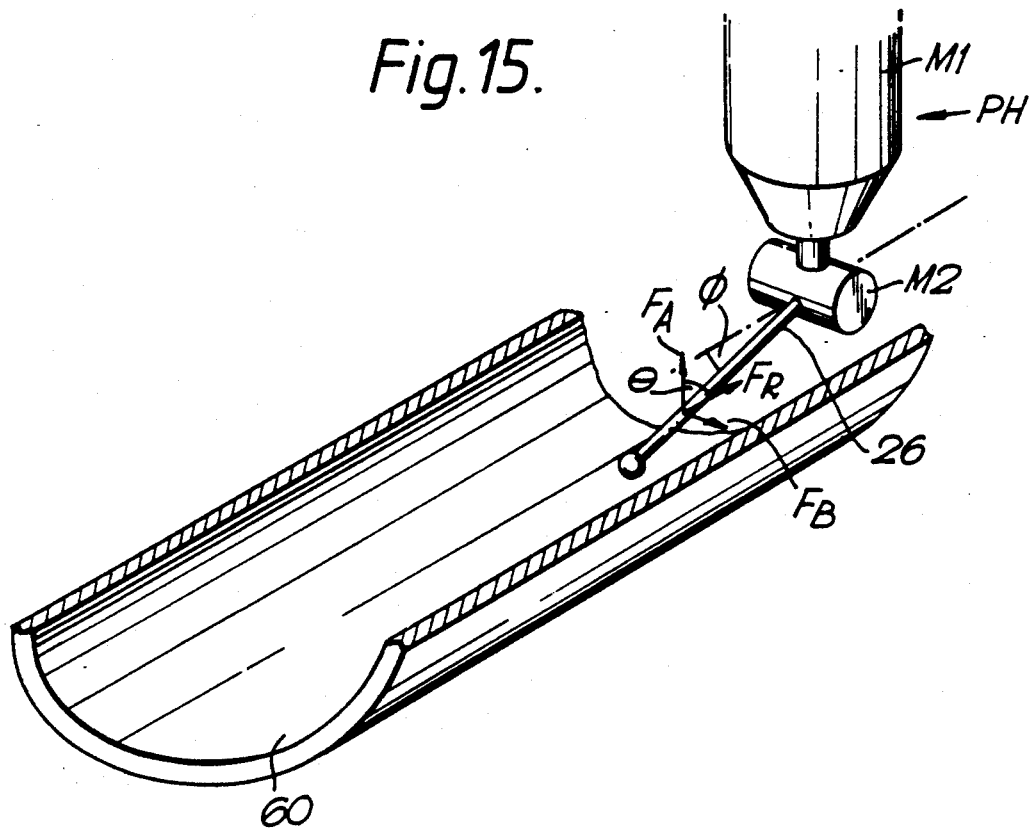
FIG. 15 is a diagrammatic representation of a further scanning operation with a mechanical stylus in which strain gauges are used on the stylus to determine stylus bending.
Figure 16:
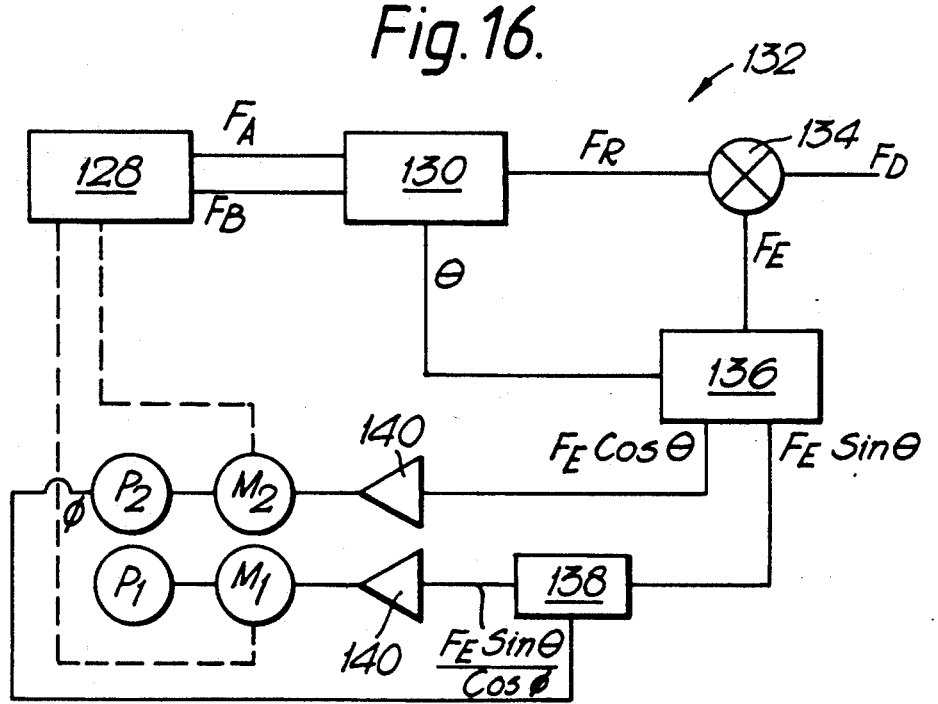
FIG. 16 shows a control system for the scanning operation of FIG. 15.

FIG. 15 shows a perspective view of a bore scanning operation, in which, for the purposes of illustration, the top half of the bore has not been shown. As with both previous scanning operations, the probe head PH is positioned so that point 28 lies on the axis of the bore 60, and the motors M1 and M2 are driven so as to bring the stylus 26 into contact with the surface of the bore 60. A force $F_D$ is determined as the desired resultant force on the stylus. The torque applied to the stylus by each of the motors M1 and M2, which will move the stylus around the surface of the bore, and will cause a force $F_D$ to act on the stylus, is estimated, and the current fed to the motors are then varied to as to generate this torque.

The strain gauge array represented schematically by reference numeral 128 (FIG. 16) outputs data corresponding to the magnitude of the two perpendicular components of the actual resultant force $F_R$ acting on the stylus. The first of the two components $F_A$ acts orthogonal to the axis of the stylus while the second, $F_B$ acts mutually orthogonal to the axis of the stylus, and the component $F_A$. The values of $F_A$ and $F_B$ are fed to a transformation circuit 130 of the control system 132, which calculates the magnitude of the resultant force $F_R$ and also the angle $\Theta$ between $F_A$ and $F_R$. The magnitude of the resultant force $F_R$ is compared with the magnitude of the desired force $F_D$ at a summing junction 134 which, in accordance with the summation, outputs a value $F_E$ corresponding to the difference between the magnitudes of $F_R$ and $F_D$. Resolving circuit 136 resolves the error signal $F_E$ into two perpendicular components, $F_E \cos\Theta$ and $F_E \sin\Theta$. Because the perpendicular distance from the axis A1 to the stylus ball 27 varies as a function of the angle $\phi$ subtended by the stylus 26 at the axis A4, the error signal sent to the motor M1 must also be a function of $\phi$, since the torque applied to the stylus 26 by the motor M1 varies as a function of the perpendicular distance between the stylus ball 27 and the axis A1. The circuit 138 compensates for this by generating a signal $F_E \sin\Theta / \cos\Theta$ (the value of $\phi$ is obtained from the position of motor M1). Both error signals are amplified by amplifiers 140, and fed to motors M1 and M2 to correct the torque applied to the stylus. The new torque applied to the stylus acts as a mechanical feedback to the strain gauge array.

An analogue probe may be provided instead of a stylus, and as with all scanning operations in general the three methods of bore scanning described above may equally be applied to scanning with an analogue probe. The major difference between using an analogue probe, and just a stylus, is that when using a probe the deflection of the stylus with respect to the probe is summed in addition to the two transducers outputs $T_1$ and $T_2$, and the output of the strain gauge array on the stylus. Preferably an analogue probe requiring only light stylus forces to produce the required deflections is used so that stylus bending is minimal and the strain gauge array on the stylus can be removed to avoid further complicating the data gathering process.

As an alternative to collecting data by continuous contact of a stylus, or analogue probe with a workpiece, data may be collected by investigating the workpiece at a discrete number of points. Using the probe head PH it is possible to collect data at a discrete number of points by mounting a touch trigger probe to the probe head. A suitable probe is described in WO86/03829.

A method of data collection using this arrangement will be described with reference to FIGS. 17 and 18. The motor M1 is positioned with its axis substantially perpendicular to the surface of the workpiece, at a height which enables the stylus to be brought into contact with the surface of the workpiece by rotation of motor M2. The motor M1 is driven with sinusoidal signal so that the stylus of the touch trigger probe oscillates with simple harmonic motion between the two chosen extremities of rotation of motor M1 which define the locii L4 and L5.

Figure 17:
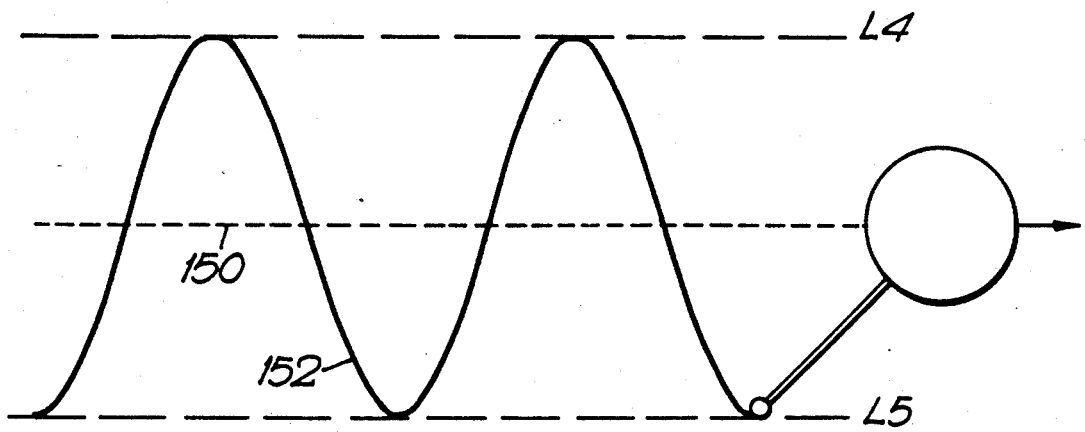
FIGS. 17 and 18 show diagrammatic representations from different angles of a further scanning operation in which touch trigger probe is used.
Figure 18:
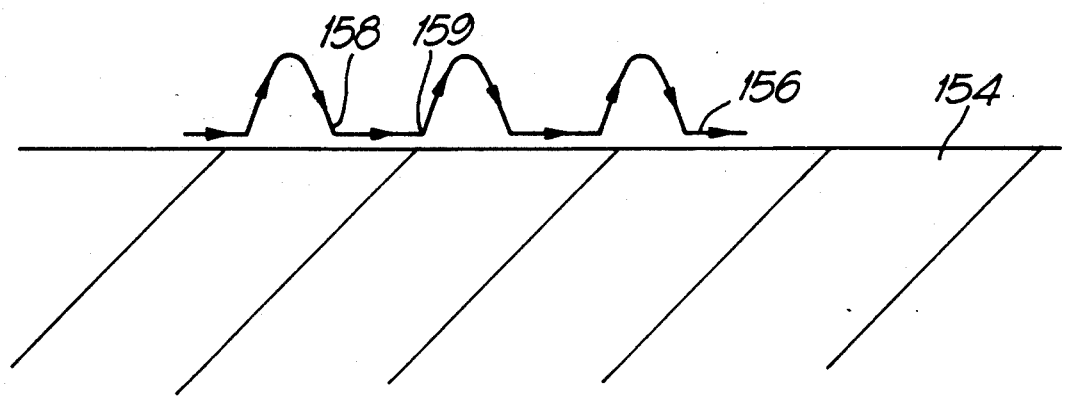

Typically, the machine to which the probe head is connected will be driven along a path 150 at constant velocity, and so in plan view, as shown in FIG. 17 the stylus will describe a raster scanning path 152. The motor M2 is also driven with a sinusoidal signal, however the driving signal for motor M2 has a frequency greater than the driving frequency of motor M1. Thus for each complete cycle of motion of motor M1, the motor M2 will complete e.g. five complete cycles. The result of the combined motions of motors M1 and M2 is that the stylus of the touch trigger probe comes into contact with the surface of the workpiece 154 at a discrete number of points along the scanning path 152 illustrated in FIG. 17. The motion of the stylus ball as viewed along the path 150 and perpendicular to the axis A1 is shown in FIG. 18 It can be seen from this figure that the motion of the stylus ball can be described as a chopped sine wave 156.

N.B. The path illustrated in this figure illustrates only the se stylus ball motion close to the path 150 of to be head, where the acceleration transverse to the path 150 is small and so the chopped sine waves have a roughly constant wavelength. Closer to the extremities of the scanning path, the wavelength of the chopped sine waves will be smaller since the transverse speed of the stylus is smaller.

The data collected using a touch trigger probe with this scanning method varies according to the type of touch trigger probe used. For example, data may be collected at the points where the stylus comes into contact with the workpiece, or additionally, where the stylus loses contact with the workpiece.

A combined touch trigger and analogue probe such as is disclosed for example in our International Publication No WO 89/05435 may be used to scan in accordance with this method, and when using this probe the collected data may fall into three categories:

1. The position of the points of first contact between the stylus of the probe and the workpiece surface indicated by reference numeral 158 in FIG. 18.

2. The position of the points at which the stylus of the probe loses contact with the workpiece surface indicated by reference numeral 159 in FIG. 18.

3. "Analogue data" providing information on the profile of the workpiece surface in between the points 158 and 159.

The data points described in 2 above can be ascertained by providing a strain gauge array on the stylus of the touch trigger probe, and detecting the point at which the output of the strain gauge drops below a pre-determined level which corresponds to substantially no forces acting on the end of the stylus. It will be appreciated that the three different categories of data mentioned above have varying degrees of accuracy and therefore may be used for differing purposes.

The data collection methods will obviously vary depending on the scanning method and operation used. For scanning where e.g. a stylus is in contact with a workpiece throughout a scanning operation, the machine outputs, the transducer outputs of the probe head, and any strain gauge outputs are simultaneously recorded at predetermined time intervals (these outputs may alternatively, if desired, be selected at predetermined spatial intervals). This yields a series of discrete data points along the scanning path. Data collected using a touch trigger probe operated according to the method described above will inevitably be a discrete series of points collected at regular intervals.

The data collected is used to determine the position in space relative to a datum, of points on a data grid (which is a mathematical representation of the workpiece surface) contained in a computer. The points on the data grid cannot be measured directly; i.e. measurements cannot be made at points on the workpiece surface which correspond exactly to the points on the mathematical representation of that surface. This is because of constraints on inspection time and also (and more fundamentally) because of the physical constraints which limit the ability of a machine to attain, within the limits of measurement accuracy, a given position (known as the tunelling performance of the machine).

Figure 19:
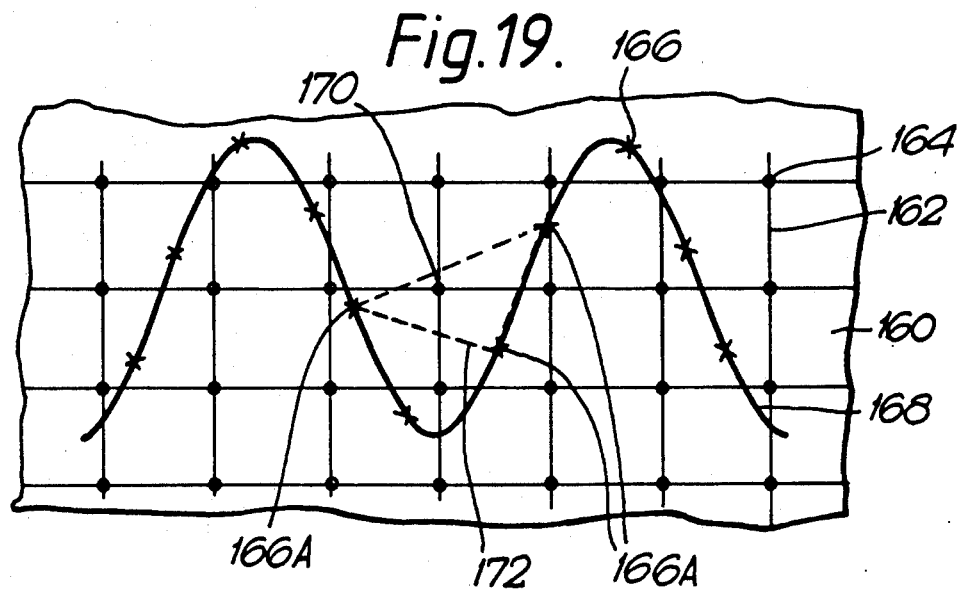
FIG. 19 illustrates the manner in which data is collected from points on a workpiece using the scanning method of the present invention.

The determination of the position in space of points on a data grid will now be described with reference to FIG. 19 FIG. 19 shows a workpiece 160,.and superimposed on the surface of the workpiece, a data grid 162. The intersection points 164 of the grid 162 are the points at which, for the purposes of expedient calculation and computer modelling it is desired to determine the position in space, relative to a datum, of the workpiece surface. For simplicity the data grid is defined as lying in the X-Y plane, and so the X and Y co-ordinates of the points 164 are known The object is thus to determine the Z co-ordinate of each of the points 164.

By virtue of a scanning operation the workpiece surface is measured at points 166 spaced at regular intervals along a raster scanning path 168. To determine the Z co-ordinates of e.g. a grid point 170, a triangle 172 is constructed, whose vertices are three measured points 166A adjacent the grid point 170 to be determined. The plane defined by the three measured points 166A is assumed to represent, within the perimeter of triangle 172 the local workpiece surface. The Z co-ordinate of the plane at the X,Y co-ordinates of grid point 170 is therefore assumed to be the Z co-ordinates of the workpiece surface.

It can be seen therefore that the dimensions of the raster scanning path are determined by the size of the triangle which can be regarded as representing a planar workpiece.

The above described embodiment of the invention have disclosed the operation of the motors as constant torque motors in which a given current supplied to the motor will produce a given torque However due to variations in magnetic flux density,or imperfect commutation, the torque generated by an electric motor may not be entirely dependent on the current applied but may also vary with the relative angular position of the rotor and stator.

In order to improve the control of the motor torque in the scanning head of the present invention, the values of torque against current may be measured and plotted and an "error map" produced which can be added to the initial information supplied to the computer so that either the current can be controlled to produce a desired torque, or the actual torque can be determined from knowledge of the current.

Such a modification could avoid the need to measure stylus bending with strain gauge arrays and enable the stylus bending to be determined directly within the required degree of accuracy.

The invention has been particularly described above with reference to a scanning head which provides pivoting action of the surface detection device about one or more axes.

However, analogue probes are known, for example from the specification of U.S. Pat. No. 3,869,799 and from the specification our co-pending International Application No PCT/GB89/01197 in which translational movements of a stylus are produced relative to orthogonal axes. The probe described in U.S. Pat. No. 3,869,799 includes motors for actuating such movement.

It is therefore within the scope of the present invention that a scanning head is constructed in accordance with the disclosure of either of these above-referenced specifications and motors are added to drive the stylus of the probe in the two orthogonal directions with enough movement to enable scanning to take place. The normal transducers within the probe would provide the scanning data when used in this way.

Such a scanning head could be used for example on surfaces inclined to the orthogonal axes of the head to avoid the complex control functions required of the constant torque motors, or for scanning external cylindrical surfaces with a cranked stylus.

It is to be understood that the different features of the invention as described above, are not necessarily limited to their association with the embodiments in connection with which they were first described. Many aspects of the invention are generally applicable to other embodiments of the invention described herein.

We claim:

1. Apparatus for gathering data relating to a surface of a workpiece, the apparatus including a part of a coordinate positioning machine, and comprising:
   a surface detecting device;
   support means for mounting the surface detecting device for movement within a three-dimensional reference framework, the support means being supported on the part of the coordinate positioning machine;
   means for producing relative movement between the surface detecting device and the surface to bring the surface detecting device into a predetermined spatial relationship with the surface;
   means for producing relative movement between the surface detecting device and the surface along a path at constant speed within the reference framework, whereby the surface detecting device passes over the surface;
   means for simultaneously producing relative oscillatory movement between the surface detecting device and the surface in a direction transverse to said path such that said surface detecting device moves through a plurality of locations; and
   means for determining at said plurality of locations relative to a datum position;
   (a) an instantaneous position of the surface detecting device relative to the support means; and
   (b) an instantaneous position of the part of the coordinate positioning machine, whereby data in respect to the positions of a plurality of points of the work surface relative to said reference framework may be gathered.

2. Apparatus as in claim 1, wherein the means for producing relative movement between the surface detecting device and the surface includes means for producing said movement at a constant velocity.

3. Apparatus as in claim 1, wherein the means for producing relative movement between the surface detecting device and the surface along the path is provided by the part of the coordinate positioning machine and said support means provides the means for producing the oscillating movements.

4. Apparatus as in claim 1, wherein the surface is a cylindrical surface which has a longitudinal axis and the means for producing relative movement along the path includes means for producing relative movement having at least a component of direction parallel to said longitudinal axis.

5. Apparatus as in claim 1, wherein the support means is a scanning head having at least one axis and the transverse are oscillating pivotal movements about said at least one axis of said scanning head.

6. Apparatus as in claim 1, wherein the support means is a scanning head having at least one axis and the transverse movements of the surface detecting device relative to the surface are oscillating translating movements relative to said at least one axis of the scanning head.

7. Apparatus as in claim 1, wherein the surface detecting device comprises a stylus having a surface contacting tip.

8. Apparatus as in claim 7, wherein the stylus includes transducers for detecting deformation of the stylus resulting from contact of the stylus with the surface.

9. An apparatus as claimed in claim 1, wherein the surface detecting device is a non-contact probe.

10. Apparatus as in claim 1, further comprising:
    means for reducing the effect on the apparatus of any forces produced in the support means in reaction to said relative oscillatory movement produced between the surface detecting device and the surface.

11. Apparatus as in claim 10, wherein the means for reducing the effect on the apparatus of the forces produced in the support means comprises a mass within the support means which is rotationally accelerated to produce an equal and opposite reaction to said forces.

12. An apparatus as in claim 10, wherein the means for simultaneously producing relative oscillatory movement is an electric motor having parts mounted for relative rotation in opposite directions.

13. Apparatus as in claim 1, further comprising control means for establishing the predetermined spatial relationship between the surface detecting device and the surface.

14. Apparatus as in claim 13, wherein the apparatus includes position-determining transducers for determining an instantaneous position of the part of the coordinate measuring machine within said reference framework.

15. Apparatus according to claim 14 and further comprising data gathering means controlled by the control means for gathering position data from the position determining transducers on the machine.

16. Apparatus according to claim 15, wherein the support means includes position determining transducers for determining the position of the surface detecting device relative each axis of the support means and the data gathering means additionally receives position data from the position determining transducers in the support means.

17. Apparatus according to claim 15 wherein the surface detecting device is an analogue probe and the data gathering means additional receives position data from the position-determining transducers in the probe.

18. Apparatus according to claim 15 wherein the surface detecting device comprises a stylus which carries transducers whereby any deformation of the stylus due to contact with the surface may be measured and the data gathering means additionally receives data from the transducers carried by the stylus.

19. Apparatus according to claim 1, wherein said support means further comprises a fixed part, a movable part and an air bearing in said fixed part supporting said movable part, the air bearing defining a first axis of movement for the support means.

20. Apparatus according to claim 19, wherein the movable part includes a second part, said second part having an axis of movement transverse to said first axis of movement of the support means, wherein said second part is supported on an air bearing and mounts said surface detecting device.

21. Apparatus as in claim 20, wherein said support means includes at least one position determining transducer for determining the position of the surface detecting device relative to the first axis of movement of the support means.

22. Apparatus as claimed in claim 20, wherein said support means includes at least one position determining transducer for determining the position of the surface detecting device relative to the axis of movement of the second part.

23. Apparatus according to claim 1, wherein said support means comprises a fixed part and a movable part, said movable part capable of rotation around an axis passing through said fixed part and said movable part, the rotation being facilitated by an air bearing.

24. Apparatus according to claim 1, wherein the means for producing relative oscillatory movement is an electric motor and further comprising a second electric motor to operate the support means to produce relative movement in a direction substantially normal to the path and normal to a local plane of the surface of the workpiece and a control means, wherein each electric motor is operable either in a positioning mode or a constant torque mode and said control means being provided to selectively switch the electric motors between the different modes of operation.

25. A method of gathering data relating to a surface of a workpiece with a surface detecting device, the device being supported on a part of a coordinate positioning machine in a three-dimensional reference framework by a scanning head providing movement of said surface detecting device with 2 degrees of freedom relative to said machine part, the workpiece being support on a table of the machine relative to which said part is movable, the method comprising the steps of:

bringing the surface detecting device into a surface detecting relationship with the surface;

operating the machine to produce relative movement between the scanning head and the workpiece surface at constant speed along a path adjacent the workpiece surface whereby the surface detecting device passes over the workpiece surface;

simultaneously operating the scanning head to produce relative oscillatory movements between the surface detecting device and the workpiece surface in a direction transverse to the instantaneous path and substantially parallel to the local plane of the workpiece surface;

maintaining the surface detecting relationship between the surface detecting device and the workpiece surface at a plurality of locations as the surface detecting device passes over the surface; and determining at said locations relative to a datum position:

(a) the instantaneous position of the surface detecting device relative to the machine part, and (b) the instantaneous position of the machine part relative to the table, and using the results of said determination to determine the positions relative to said reference framework of a plurality of points on the workpiece surface.

26. A method as claimed in claim 25 and in which the surface detecting relationship between the surface detecting device and the workpiece surface is maintained by operating the scanning head additionally to produce relative movement between the surface detecting device and the surface in a direction substantially normal to the instantaneous path and normal to the local plane of the workpiece surface.

27. A method as claimed in claim 26 and in which the relative movements between the surface detecting device and the workpiece surface in a direction substantially normal to the instantaneous path and normal to the local plane of the workpiece surface provided by said scanning head are oscillating movements.

28. A method as claimed in claim 27 and wherein the surface to be scanned is a cylindrical surface in or on the workpiece and which has a longitudinal axis, and the path has at least a component of direction parallel to said longitudinal axis.

29. A method as claimed in claim 25 and in which said relative movement between the scanning head and the workpiece surface take place in a straight line at constant velocity.

30. A method as claimed in claim 25, wherein the scanning head has at least two axes and the transverse movements of the surface detecting device relative to the surface are oscillating pivoting movements about at least one of said axes of the scanning head.

31. A method as claimed in claim 25, wherein the scanning head has at least two axes and the transverse movements of the surface detecting device relative to the surface are oscillating translating movements to at least one of said axes of the scanning head.

32. A method as claimed in claim 25 and wherein the surface detecting device comprises a stylus having a surface-contacting tip, and the surface detecting relationship thereof with the surface is a relationship in which the surface contacting tip is in contact with the surface.

33. A method as claimed in claim 32 and wherein the stylus carries transducers whereby any deformation of the stylus due to contact with the surface may be determined, the method further comprising the steps of:

determining from the transducers on the stylus the amount by which the stylus may be deformed, and, using the results of such determination in determining the positions of points on the surface in said coordinate framework relative to said datum position.

34. A method as claimed in claim 25 and wherein the surface detecting device is a touch trigger probe having a stylus with a surface-contacting tip, and the surface detecting relationship thereof with the surface is a relationship in which the surface contacting tip is in contact with the surface.

35. A method as claimed in claim 25 and wherein the surface detecting device is an analogue probe having a stylus with a surface-contacting tip, the surface detecting relationship thereof with the surface being a relationship in which the surface contacting tip is in contact with the surface, the probe having transducers whereby the positions of the stylus relative to the probe may be determined, the method comprising the further steps of:
determining from the transducers of the analogue probe the position of the stylus relative to the probe at each one of said plurality of locations, and, using the results of such determination in determining the positions of points on the surface in said coordinate framework relative to said datum position.

36. A method as claimed in claim 25 and wherein the surface detecting device is a non-contact probe and the surface detecting relationship thereof with the surface is a relationship in which the probe is positioned at a predetermined distance from the surface.

* * * * *